United States Patent
Edsinger et al.

(10) Patent No.: US 9,694,495 B1
(45) Date of Patent: Jul. 4, 2017

(54) VIRTUAL TOOLS FOR PROGRAMMING A ROBOT ARM

(71) Applicant: Redwood Robotics, Inc., San Francisco, CA (US)

(72) Inventors: Aaron Edsinger, San Francisco, CA (US); Advait Jain, San Francisco, CA (US); Anthony Jules, Oakland, CA (US)

(73) Assignee: Redwood Robotics Inc., San Francisco, CA (US)

( * ) Notice: Subject to any disclaimer, the term of this patent is extended or adjusted under 35 U.S.C. 154(b) by 264 days.

(21) Appl. No.: 14/312,905

(22) Filed: Jun. 24, 2014

Related U.S. Application Data

(60) Provisional application No. 61/838,720, filed on Jun. 24, 2013.

(51) Int. Cl.
G05B 15/00 (2006.01)
G05B 19/00 (2006.01)
B25J 9/16 (2006.01)

(52) U.S. Cl.
CPC ............ B25J 9/1633 (2013.01); *Y10S 901/02* (2013.01); *Y10S 901/28* (2013.01)

(58) Field of Classification Search
CPC .............................. B25J 9/1633; B25J 9/1664
USPC ........................................................ 700/261
See application file for complete search history.

(56) References Cited

U.S. PATENT DOCUMENTS

| 5,506,999 A * | 4/1996 | Skillman ............... G06F 9/5083 706/10 |
| 8,504,206 B2* | 8/2013 | Fudaba ...................... B25J 3/04 700/253 |
| 9,186,795 B1* | 11/2015 | Edsinger ............... B25J 9/1694 |
| 9,592,608 B1* | 3/2017 | Bingham ............... B25J 9/1674 |
| 2011/0087371 A1* | 4/2011 | Sandberg ............. G05D 1/0246 700/245 |
| 2011/0190932 A1* | 8/2011 | Tsusaka ................... B25J 13/08 700/254 |
| 2011/0208355 A1* | 8/2011 | Tsusaka ................. B25J 9/1664 700/246 |
| 2012/0123590 A1* | 5/2012 | Halsmer ................ B25J 9/1656 700/264 |
| 2013/0245824 A1* | 9/2013 | Barajas .................. B25J 9/1664 700/253 |
| 2013/0338830 A1* | 12/2013 | Roethling ............ G05B 19/423 700/257 |

(Continued)

*Primary Examiner* — Harry Oh
(74) *Attorney, Agent, or Firm* — McDonnell Boehnen Hulbert & Berghoff LLP

(57) ABSTRACT

A robotic device may: receive movement information associated with a plurality of subtasks performed by a manipulator of a robotic device, where the movement information indicates respective paths followed by the manipulator while performing the respective subtasks and respective forces experienced by the manipulator along the respective paths; determine task information for a task to be performed by the robotic device, where the task comprises a combination of subtasks of the plurality of subtasks, where the task information includes a trajectory to be followed by the manipulator, and forces to be exerted by the manipulator at points along the trajectory; and determine, based on the task information, torques to be applied over time to the manipulator via a joint coupled to the robotic device to perform the task.

20 Claims, 12 Drawing Sheets

(56) References Cited

U.S. PATENT DOCUMENTS

2014/0172143 A1\* 6/2014 Fudaba .................. B25J 9/1656
              700/108

\* cited by examiner

VIRTUAL TOOLS FOR PROGRAMMING A ROBOT ARM

CROSS REFERENCE TO RELATED APPLICATION

The present application claims priority to U.S. Provisional patent application Ser. No. 61/838,720, filed on Jun. 24, 2013, and entitled "Virtual Mechanisms for Programming a Robot Arm," which is herein incorporated by reference as if fully set forth in this description.

BACKGROUND

Robotic systems, such as a robotic manipulator having an end-effector, may be used for performing tasks involving picking up and moving objects, inserting objects, machining parts, etc. For instance, a robotic device may be used to polish an object having a particular geometry. Such a robotic device may direct a robotic manipulator to follow a certain trajectory to perform a given task.

SUMMARY

The present disclosure describes embodiments that relate to using virtual mechanisms for programming a robotic device. In one aspect, the present disclosure describes a method. The method includes receiving movement information associated with a plurality of subtasks performed by a manipulator of a robotic device. Respective subtasks of the plurality of subtasks comprise respective motions of the manipulator in response to respective external forces applied to the manipulator. The movement information indicates respective paths followed by the manipulator while performing the respective subtasks and respective forces experienced by the manipulator along the respective paths. The method also includes determining task information for a task to be performed by the robotic device. The task comprises a combination of subtasks of the plurality of subtasks. The task information includes a trajectory to be followed by the manipulator, where the trajectory comprises a combination of paths corresponding to the combination of subtasks. The task information also includes forces to be exerted by the manipulator at points along the trajectory, where the forces are based on the respective forces experienced by the manipulator while performing subtasks of the combination of subtasks. The method further includes determining, based on the task information, torques to be applied over time to the manipulator via a joint coupled to the robotic device to perform the task.

In another aspect, the present disclosure describes a computer readable memory having stored thereon executable instructions that, upon execution by a computing device, cause the computing device to perform functions. The functions include receiving movement information associated with a plurality of subtasks performed by a manipulator of a robotic device. Respective subtasks of the plurality of subtasks comprise respective motions of the manipulator in response to respective external forces applied to the manipulator. The movement information indicates respective paths followed by the manipulator while performing the respective subtasks and respective forces experienced by the manipulator along the respective paths. The functions also include determining task information for a task to be performed by the robotic device. The task comprises a combination of subtasks of the plurality of subtasks. The task information includes a trajectory to be followed by the manipulator, where the trajectory comprises a combination of paths corresponding to the combination of subtasks. The task information also includes forces to be exerted by the manipulator at points along the trajectory, where the forces are based on the respective forces experienced by the manipulator while performing subtasks of the combination of subtasks. The functions further include determining, based on the task information, torques to be applied over time to the manipulator via a joint coupled to the robotic device to perform the task.

In still another aspect, the present disclosure describes a robotic device. The robotic device includes a manipulator and a joint coupled to the manipulator. The robotic device also includes one or more processors. The robotic device further includes a memory having stored thereon executable instructions that, upon execution by the one or more processors, cause the robotic device to perform functions. The functions include receiving movement information associated with a plurality of subtasks performed by the manipulator. Respective subtasks of the plurality of subtasks comprise respective motions of the manipulator in response to respective external forces applied to the manipulator. The movement information indicates respective paths followed by the manipulator while performing the respective subtasks and respective forces experienced by the manipulator along the respective paths. The functions also include determining task information for a task to be performed by the robotic device. The task comprises a combination of subtasks of the plurality of subtasks. The task information includes a trajectory to be followed by the manipulator, where the trajectory comprises a combination of paths corresponding to the combination of subtasks. The task information also includes forces to be exerted by the manipulator at points along the trajectory, where the forces are based on the respective forces experienced by the manipulator while performing subtasks of the combination of subtasks. The functions further include determining, based on the task information, torques to be applied over time to the manipulator via a joint coupled to the robotic device to perform the task.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
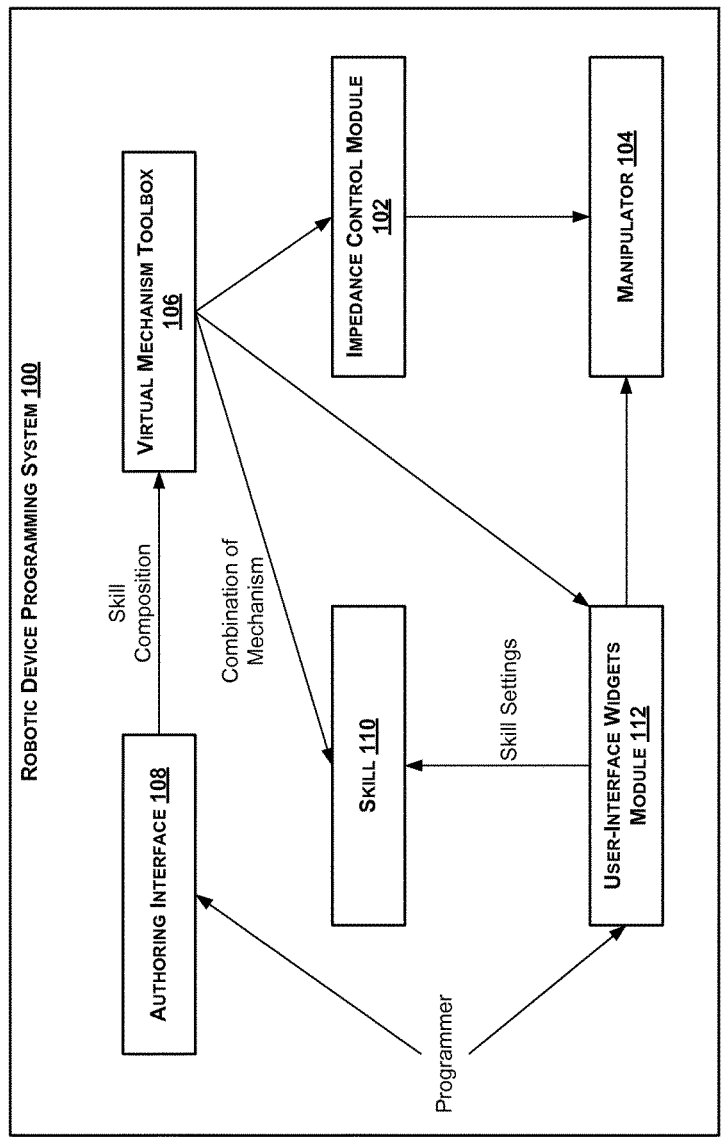
FIG. 1 illustrates a block diagram of an example system for programming a robotic device, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. INTRODUCTION

A robotic device having a manipulator and an end-effector (e.g., end-of-arm tool) can be instructed to execute a task by defining a trajectory to be followed by the end-effector using a computer program. However, a user of the robotic device who is not familiar with computer programming methods of the robotic device may have difficulty defining a task for the robotic device. Further, defining the trajectory of the robotic device involves position-controlling of the end-effector, which may not be suitable for force-based tasks such as inserting a peg in a tight tolerance hole.

In order to facilitate programming of the robotic device, manipulators of the robotic device can be used as a programming interface for authoring 'skills' such as inserting two parts together or polishing a surface. The word "skill" is used herein to indicate a task to be performed by the robotic device, and "authoring a skill" indicates defining a task. A skill can be represented by a structured assortment of haptically realized mechanisms (such as sliders, springs, etc.). The structured relationship of these mechanisms over time can be captured with a Finite State Machine (FSM), Finite Autonoma, or similar construct. Each node in the FSM represents a mechanism that is haptically simulated on an impedance-controlled manipulator of a robotic device.

As an example for illustration, a given task may be divided into several subtasks. When the subtasks are executed, a meaningful unit of work is done and the task is performed. Some of the subtasks are performed in sequence, while others may be performed in parallel. A user may author a skill by defining one or more mechanism (i.e., subtasks), that when executed by a manipulator of the robotic device, the manipulator moves in such a way that the trajectory and forces imparted by the manipulator solve the skill, i.e., perform the task. The user may physically interact with the manipulator in a way that an input value (e.g., position or force) is inferred by the robotic device. For example, the user may push on the manipulator with a force, and the robotic device infers that this is the force the manipulator would apply to an object while performing a task. In this manner, a user who is not familiar with complex computer programming code for robotic devices, may program or instruct the robotic device to perform a task by physical interaction with the robotic device.

Further, the user who authored the skill or another end-user may input specific information related to the task (e.g., how hard to push on a table) to further refine the task. Such information may be input by the end-user via a virtual or graphical user-interface (UI) widget. For instance, the user may hold the end-effector and move it around. Such motion of the end-effector may correspond to navigating the UI. As an example, pushing the end-effector may correspond to a mouse-click that results in selecting a user-interface item in the UI.

II. EXAMPLE SYSTEMS

Referring now to the Figures, FIG. 1 illustrates a block diagram of an example system 100 for programming a robotic device, in accordance with an embodiment. The system 100 includes an impedance control module 102 configured to control a manipulator 104 of a robotic device. The impedance control module 102 may include a Cartesian impedance controller for the manipulator 104 that allows the impedance/stiffness of an end-effector coupled to the manipulator 104 to be actively controlled in a six-degrees-of-freedom frame of the end-effector.

The impedance control module 102 may be configured to control dynamic interaction between the manipulator 104 and the end-effector coupled to the manipulator 104 with an environment. The impedance control module 102 may be configured to treat the environment as an admittance and the manipulator 104 as an impedance. In this manner, the impedance control module 102 may be configured to cause the manipulator 104 to generate or apply a force in response to a motion imposed by the environment. The impedance control module 102 may receive inputs indicative of a position, velocity, and/or acceleration and, in response, cause the manipulator 104 to apply a particular force. The robotic device may include a joint coupled to the manipulator 104. The joint may be configured to apply, based on commands from the impedance control module 102, a torque to the manipulator 104 so as to cause the manipulator 104 to follow a commanded trajectory and apply a commanded force. The robotic device may include six-degrees-of-freedom force/torque sensors configured to measure forces experienced by manipulator 104 and/or torques experienced by the joint in all six spatial dimensions (i.e., forces in the three translational dimensions, and torques around the three dimensions). In another example, the robotic device may also include a single degree-of-freedom torque sensor at each joint to measure the joint torques. The impedance control module 102 may be configured to receive the sensor measurements, and use the sensor measurements to determine appropriate commands to the joint.

The system 100 also includes a virtual mechanism toolbox 106. The virtual mechanism toolbox 106 may include a plurality of virtual tools, where each "tool" is a simulation of a mechanical mechanism. An example tool includes a drawer slider mechanism. For the manipulator 104 to simulate a drawer slider mechanism, when a user pushes on the manipulator 104 or an end-effector attached thereto, the manipulator 104 may be configured to move with low stiffness along one linear axis, but with high stiffness on all other axes. This creates the haptic sense (i.e., tactile feedback) that the user is interacting with a drawer.

Another example tool includes a "cone" mechanism, where motion of an end-effector coupled to the manipulator 104 simulates a constrained motion tracing a boundary of a cone. Such a motion may for example simulate an insertion operation where a cone tip point is placed below an insertion point. Still another example tool includes a "plane" mechanism, where the end-effector is constrained to planar motion. In this example, the end-effector may be configured to move with low stiffness along X and Y axes, but with high stiffness on Z vertical axis. This "plane" tool may be useful in defining a wiping or polishing operation to be performed by the robotic device, for example.

Yet still another example tool includes a "spring" mechanism, where the end-effector behaves as if a viscous spring (spring and a damper) attach the end-effector to a an axis of motion such that the end-effector applies a force or pushes on a surface with a particular stiffness to simulate, for example, a push on a button or a door. Another example tool includes a "wall" mechanism, where the end-effector is free to float, but is constrained within virtual walls. This mechanism may allow a user to define a safe workspace or guide the end-effector along a trajectory, for example.

Still another example tool includes a "slider" mechanism, where the end-effector is constrained to move along an axis, allowing a user to define an angle of approach to an object. Yet still another example tool includes a "rail" mechanism, where the end-effector is constrained to move along a three-dimensional curve of any arbitrary shape. The end-effector may be constrained to the curve using virtual springs with definable stiffness. Another example tool includes an "orthogonal detent" mechanism, where the end-effector is moved or rotated to a certain position and locked into place to simulate a mechanical spring detent lock-and-click mechanism. These example tools are for illustration only, and many other such tools are contemplated.

Thus, the virtual mechanism toolbox 106 includes a plurality of tools for simulating a corresponding plurality of basic mechanisms. These basic mechanisms may be considered subtasks. Complex tasks can be authored or defined by combining such basic mechanisms in a given order. Authoring interface 108 may be configured to allow a programmer to compose a manipulation "skill" or task using a combination of virtual mechanisms defined by the virtual mechanism toolbox 106. As an example for illustration, a skill or a task may involve moving an object from one location to another location along an S-shaped path and inserting the object in a hole. This task may thus involve at least a "rail" mechanism followed by a "cone" mechanism. The task may involve other mechanisms as well. A programmer may select a "rail" tool from the virtual mechanism toolbox 106, physically hold the end-effector or the manipulator 104, and trace the S-shaped path. Then, the programmer may select a "cone" tool from the virtual mechanism toolbox 106, and guide the end-effector through a constrained motion tracing a boundary of a cone leading to the hole in which the object is to be inserted.

In this manner, the authoring interface 108 allows a user to compose a task or skill 110 by selecting tools (i.e., subtasks) from the virtual mechanism toolbox 106 and physically interacting with the manipulator 104. Based on the interaction with the manipulator 104, the impedance control module 102 may be configured to infer, for each tool or subtask, a path for the manipulator 104 or the end-effector attached thereto, and forces that should be applied by the end-effector. The impedance control module 102 may further be configured to combine the subtasks or tools so as to compose the skill 110. Although the aforementioned description specifies that a user is physically interacting with the manipulator 104, any other source of an external force could be applied to interact with the manipulator 104.

In some examples, physical interaction with the manipulator 104 may not be sufficient to accurately define parameters for the tools of the virtual mechanism toolbox 106. A user may want to refine some of the parameters to accurately define the subtasks to be combined to compose the skill 110. For instance, the user may set a value for a force to be applied at a given point along a path of the manipulator 104. As another example, in addition to guiding the manipulator 104 through a cone associated with the "cone" mechanism, the user may manually set or refine values that accurately define the cone (e.g., taper angle of the cone, diameters/perimeter of the base, height of the cone, etc.). User-interface widgets module 112 may be configured to provide the user with a way to define the parameters using the manipulator 104 and/or the end-effector attached thereto as an input device.

The user-interface widgets module 112 may provide a user-interface on a display coupled to the robotic device. The user-interface may include a plurality of user-interface items associated with parameters describing the subtasks or the mechanisms of the virtual mechanism toolbox 106. The user-interface may be navigated by scrolling up and down, selecting radio buttons or selectable items, changing values of parameters, switching between different screens or interfaces, virtual knobs that can be turned to change parameter values, etc. A user may select user-interface items or use the user-interface items to specify parameters for the subtasks. Based on the user's interaction with the user-interface, the user-interface widgets module 112 may receive inputs related to specifying or revising the parameters.

In an example, the user-interface widgets module 112 may be configured to use the tools of the virtual mechanism tool box 106 as simulations of input devices. For example, the "slider" mechanism of the virtual mechanism tool box 106 may be used to simulate scrolling up and down. A user may thus select the "slider" mechanism and move the end-effector up and down and in response, the user-interface is scrolled up and down to show different portions of the user-interface. As another example, the user may select the "spring" mechanism to simulate pressing on or selecting a button. In still another example, the user may select the "plane" mechanism and move the end-effector in a plane so as to simulate moving a cursor (reticle) to navigate the user-interface. The cursor is then positioned at a given position on the user-interface by moving the end-effector to an arbitrary location and orientation, where the impedance control module 102 maintains the manipulator 104 in a low impedance gravity compensation mode to lock the end-effector in position.

In yet still another example, the user may select the "orthogonal detent" mechanism and rotate the end-effector to a certain position where the end-effector is locked into place to simulate rotating a virtual knob of the user-interface to a certain position corresponding to a particular value of a given parameters. Further, using the "orthogonal detent" mechanism, the end-effector may be aligned to 90/45 degree orientations, using a spring detent lock-and-click, allowing the user to input precise geometric parameters. For instance, the end-effector may be constrained to move along set axes (e.g., 90/45 degree axes). The user can grab the end-effector and toggle between the two axes. The user may experience such toggling haptically as a spring detent type switch. The user may thus push the end-effector to a certain force and the end-effector can move to different axes and is snapped or "clicked" in place.

In an example, the user-interface widgets module 112 may be coupled to a speaker. The user-interface widgets module 112 may be configured to complement a widget with a sound. For instance, the detent widget or mechanism may be complemented with a sound indicting a "click" that is characteristic of a physical detent mechanism.

Components of the system 100 may be configured to work in an interconnected fashion with each other and/or with other components coupled to respective systems. One or more of the described functions or components of the system 100 may be divided up into additional functional or physical components, or combined into fewer functional or physical components. In some further examples, additional functional and/or physical components may be added to the examples illustrated by FIG. 1. Still further, any of the components of the system 100 may include or be provided in the form of a processor (e.g., a microprocessor, a digital signal processor, etc.) configured to execute program code including one or more instructions for implementing logical functions described herein. The system 100 may further include any type of computer readable medium (non-transitory medium) or memory, for example, such as a storage device including a disk or hard drive, to store the program code that when executed by one or more processors cause the system 100 to perform the functions described above. In an example, the system 100 may be included within other systems. In another example, the system 100 may be included within a robotic device.

III. EXAMPLE METHODS

Figure 2:
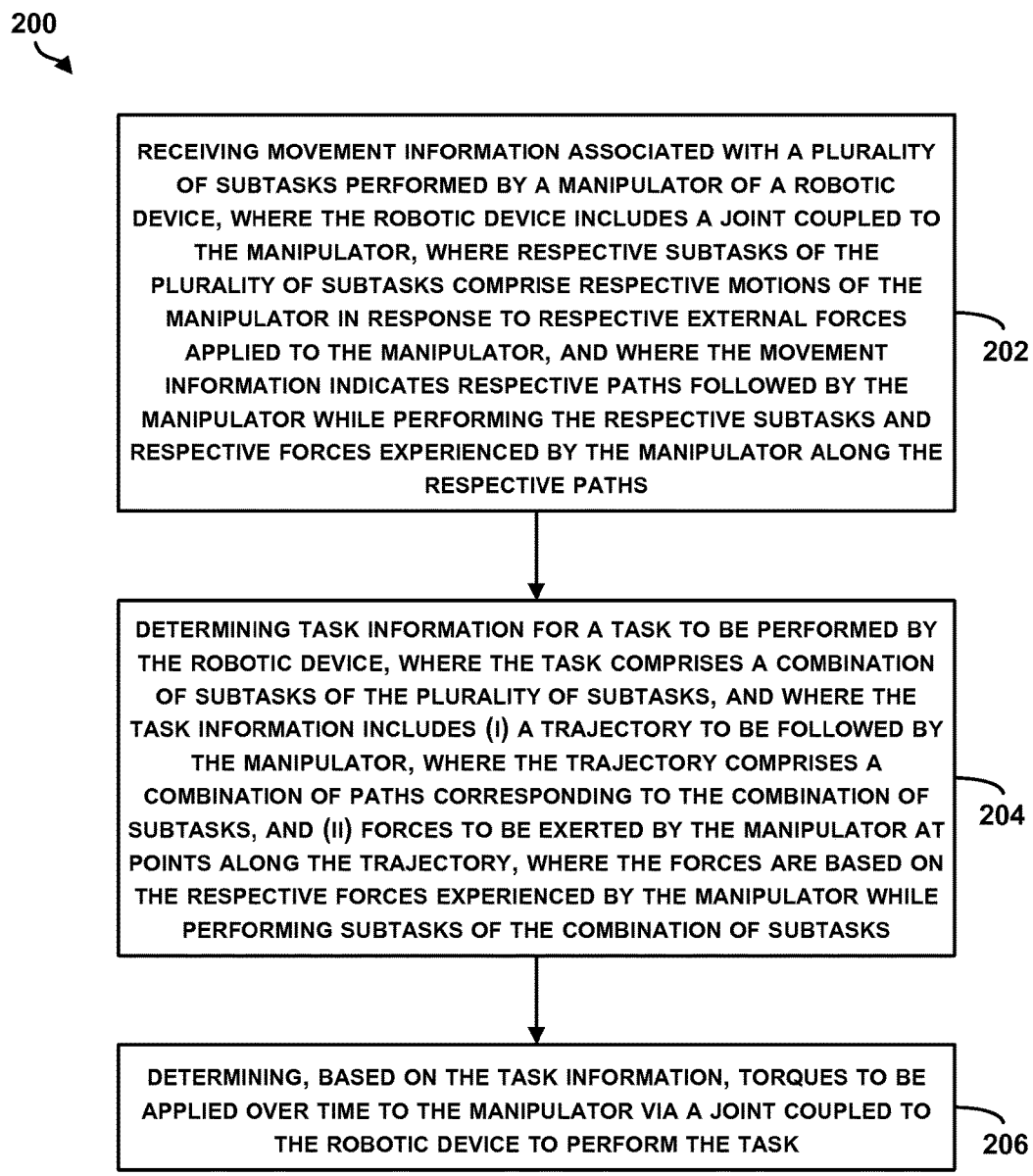
FIG. 2 is a flow chart of a method for programming a robotic device, in accordance with an example embodiment.

FIG. 2 is a flow chart of a method 200 for programming a robotic device, in accordance with an example embodiment. The method 200 may include one or more operations, functions, or actions as illustrated by one or more of blocks 202-206. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. In addition, for the method 200 and other processes and methods disclosed herein, each block in FIG. 2 may represent circuitry that is wired to perform the specific logical functions in the process. In an example, the system 100 described with respect to FIG. 1 may be configured to implement the method 200.

At block 202, the method 200 includes receiving movement information associated with a plurality of subtasks performed by a manipulator of a robotic device. Respective subtasks of the plurality of subtasks comprise respective motions of the manipulator in response to respective external forces applied to the manipulator. The movement information indicates respective paths followed by the manipulator while performing the respective subtasks and respective forces experienced by the manipulator along the respective paths.

Figure 3A:
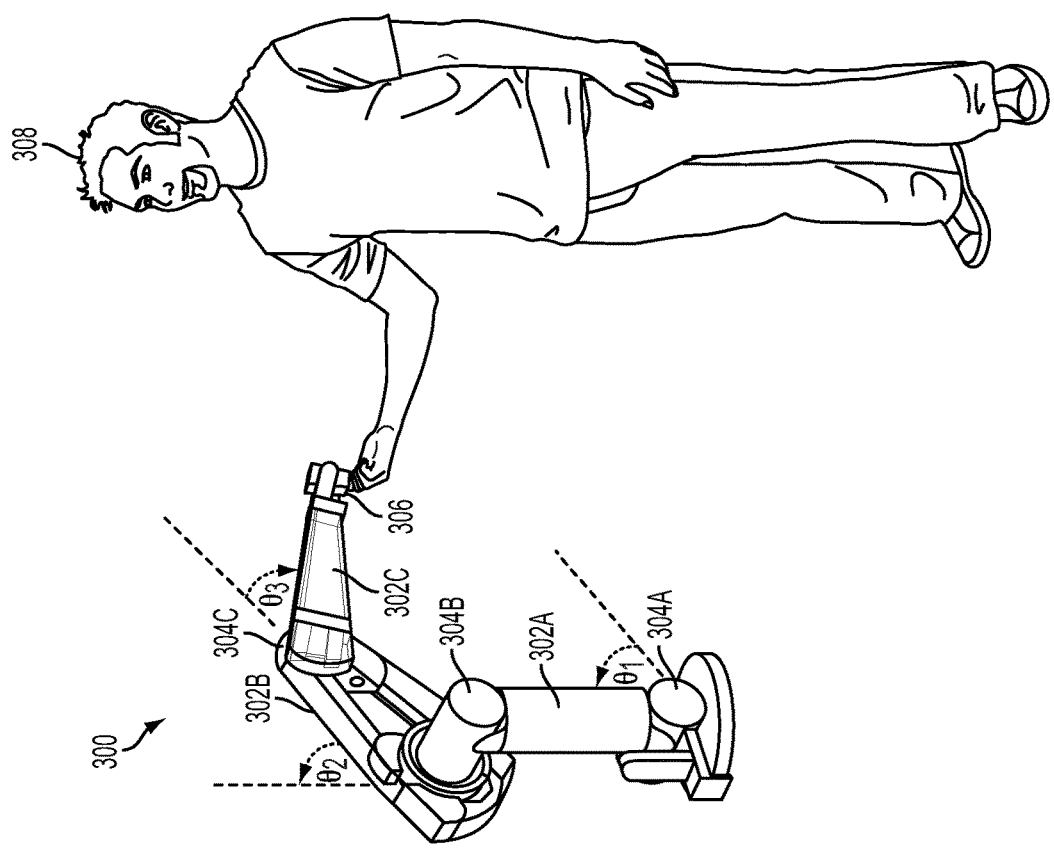
FIG. 3A illustrates an example robotic device, in accordance with an example embodiment.

FIG. 3A illustrates an example robotic device 300, in accordance with an example embodiment. The robotic device 300 may include a plurality of manipulator or arms such as the manipulators 302A, 302B, and 302C. The robotic device 300 may also include a plurality of joints 304A, 304B, and 304C. The joint 304A may be configured to connect or couple the manipulator 302A to fixed plane or frame of reference (e.g., ground). The joint 304B couples the manipulator 302B to the manipulator 302A, and the joint 304C couples the manipulator 302C to the manipulator 302B. The robotic device 300 may further include an end-effector 306 coupled to the manipulator 302C. As an example, the end-effector 306 may represent a robotic end-of-arm tool configured to perform a certain task such as deburring, polishing, grinding, capturing and placing an object, etc.

A computing device may be configured to control the robotic device 300 to perform certain tasks. The computing device may be coupled to, included in, or remote from, but in communication with, the robotic device 300. The computing device may take any form. As examples, the computing device may include one or more general-purpose processors and/or one or more special-purpose processors (e.g., image processor, digital signal processor, etc.). To the extent that the computing device includes more than one processor, such processors could work separately or in combination. The computing device can be, for example, a mobile phone, personal digital assistant (PDA), laptop, notebook, or netbook computer, tablet computing device, a wearable computing device, etc. The computing device may be configured to control functions of the robotic device 300 based on inputs specifying a particular task to be performed by the robotic device 300. In an example, the computing device may include all or part of the system 100 described at FIG. 1.

In an example, the computing device may be configured to receive information indicative of a task to be performed by the robotic device by demonstration. In one case, the demonstration may involve a user 308 grabbing the end-effector 306 and/or the manipulator 302C (or either of the manipulators 302A and 302B) of the robotic device 300 and moving the end-effector 306 and/or the manipulator 302C to trace a path to be followed by the end-effector 306 (e.g., contour of an object, a path associated with an insertion task, etc.). Demonstration could also involve providing inputs about the forces to be exerted by the end-effector 306 while following the path. As one example, the computing device may be configured to position the manipulator 302C in a nominal posture, and the user 308 may push on the end-effector 306 or manipulator 302C to demonstrate the force to be exerted by the end-effector 306. Alternately, the user 308 can remotely operate the robotic device 300 (e.g., from a phone, a tablet, a wearable computing device, etc.) to slowly increase the force or move the end-effector 306 by small amounts until the force reaches a given value. In examples, instead of the user 308 performing the demonstration, any other source of an external force (e.g., another robotic device,) can be used to apply a particular force or a sequence of forces to the end-effector 306 and move the end-effector 306 according to a given trajectory.

In examples, a task to be performed by the robotic device 300 may be divided into a plurality of subtasks. Each subtask may correspond to a tool from a virtual mechanism toolbox such as the virtual mechanism toolbox 106 described above at FIG. 1. Thus, a complex task can be defined by combining basic subtasks performed in a given order (some subtasks may be performed in parallel).

Figure 3B:
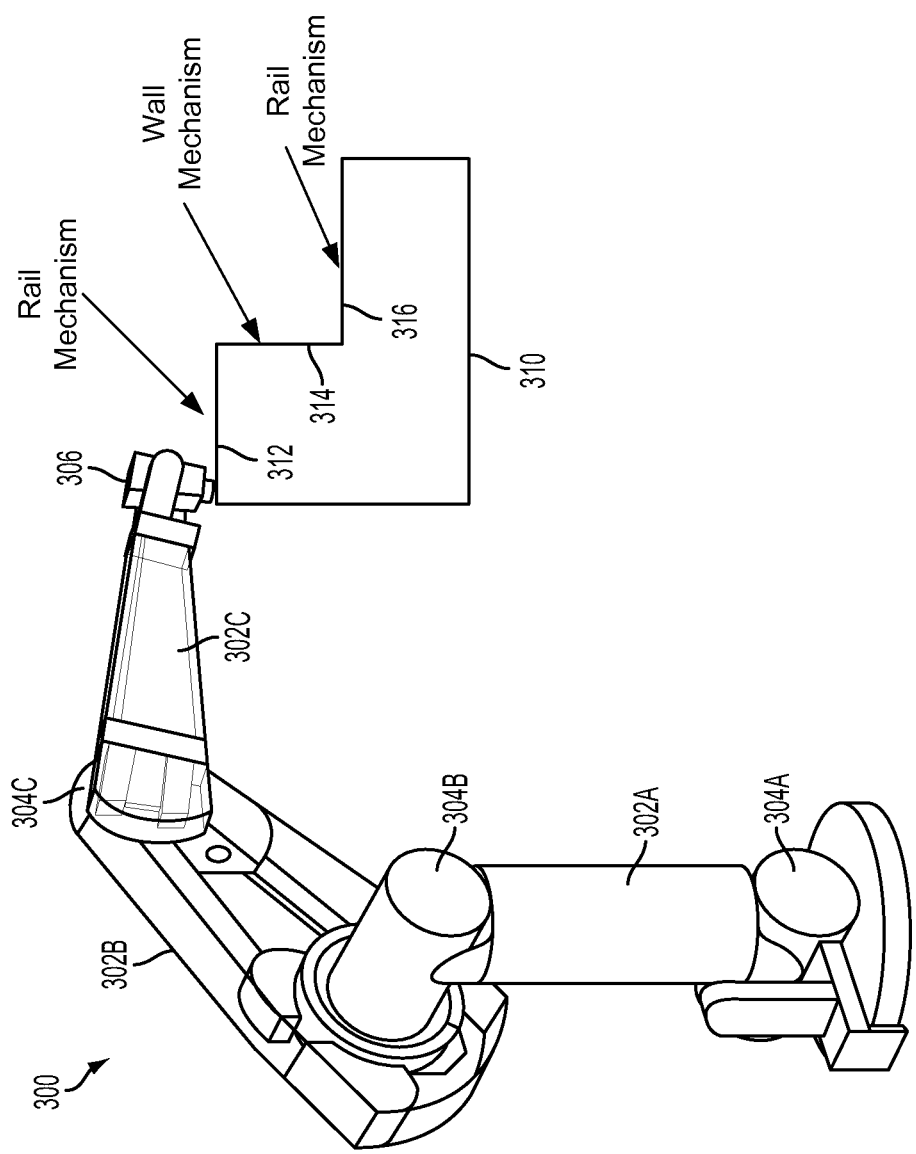
FIG. 3B illustrates an example task divided into subtasks, in accordance with an example embodiment.

FIG. 3B illustrates an example task divided into subtasks, in accordance with an example embodiment. As an example for illustration, a task may involve tracing a contour of an object 310. Such a task may involve at least three subtasks. The first subtask may be associated with tracing an edge 312. A second subtask may be associated with tracing a wall 314. A third subtask may be associated with tracing an edge 316. Thus, the task may involve, for example, a "rail" mechanism followed by a "wall" mechanism, then followed by another "rail" mechanism as show in FIG. 3B. The task may involve other mechanisms as well. The user 308 may select a "rail" tool from the virtual mechanism toolbox, physically hold the end-effector 306 and/or the manipulator 302C, and trace the edge 312 of the object 310. Also, the user 308 may select a "wall" tool from the virtual mechanism toolbox, and guide the end-effector 306 along the wall 314 of the object 310. Further, the user 308 may select a "rail" tool from the virtual mechanism toolbox, and guide the end-effector 306 along the edge 316 of the object 310.

The computing device may be configured to receive movement information for each subtask. The movement information may be received, for example, via force/torque and position sensors coupled to the end-effector 306, the manipulators 302A, 302B, and 302C, and the joints 304A, 304B, and 304C. The movement information may indicate a path traced by the end-effector 306 and the manipulators 302A, 302B, and 302C for each subtask. The movement information may also indicate external forces and constraints applied to the end-effector 306 and the manipulators 302A, 302B, and 302C while performing each subtask. For instance, the user 308 may be pushing on the end-effector 306 with a particular force while tracing the edge 312, and accordingly the end-effector 306 applies a respective force on the object 310. In response to the forces applied by the end-effector 306 on the object 310, as a result of the user 308 pushing on the end-effector 306, the end-effector 306 experiences corresponding forces (e.g., reaction forces). Such reaction forces experienced by the end-effector 306 are determined via sensors coupled to the robotic device, and may be included in the movement information received at the computing device.

In some examples, physical interaction with the end-effector 306 and the manipulators 302A, 302B, and 302C may not be sufficient to accurately define parameters for a given subtask. For instance, a force that the end-effector 306 applies to grind or deburr the edge 316 may be a large force that the user 308 may not be capable of demonstrating. In these examples, the user 308 may want to refine some of the parameters to accurately define the subtasks to be combined to compose the task.

The computing device may be configured to generate a display of a user-interface including a plurality of user-interface items associated with parameters defining the subtasks (e.g., parameters defining a path associated with the subtask and forces exerted along the path). As an example, a user-interface item may be associated with a parameter of an equation that describes a path of the end-effector 306 in a Cartesian coordinate system. Another user-interface item may be associated with a parameter defining an amount of force to be applied at a given point or incremental increase in forces along a given path. The user-interface items may take the form of selectable buttons, radio buttons, sliders associated with a range for a parameter, etc. These are examples for illustrations only, and other user-interface items and parameters are contemplated.

The user-interface may be navigated by scrolling up and down, selecting radio buttons or selectable items, changing values for parameters, switching between different screens or interfaces, turning virtual knobs to change parameter values, etc. The user 308 may select user-interface items or use the user-interface items to specify parameters for the subtasks. Based on the user's interaction with the user-interface, the computing device may receive inputs related to specifying or revising the parameters. The robotic device 300, and specifically the end-effector 306 and/or the manipulators 302A, 302B, and 302C, can be used as an input device configured to navigate the user-interface and revise the parameters.

Figure 4:
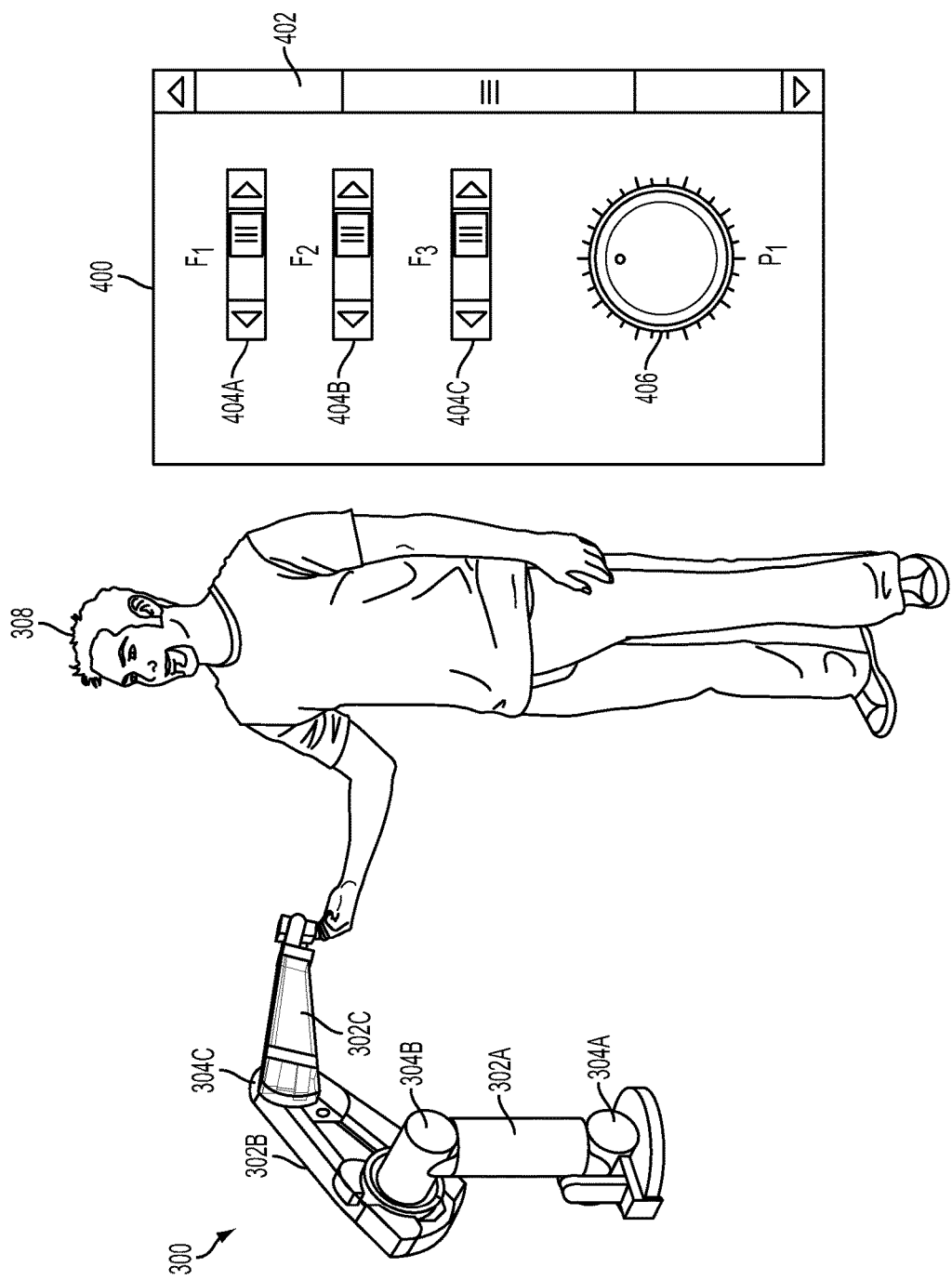
FIG. 4 illustrates using the robotic device as an input device, in accordance with an example embodiment.

FIG. 4 illustrates using the robotic device 300 as an input device, in accordance with an example embodiment. As shown in FIG. 4, the computing device may generate a display of a user-interface 400 that has a scroll bar 402 to navigate the user interface up and down. The user-interface 400 may also have slider bars 404A, 404B, and 404C that depict a range of forces for a force $F_1$ associated with a first subtask, a force $F_2$ associated with a second subtask, and a force $F_3$ associated with a third subtask. As described with respect to the user-interface widgets module 112 in FIG. 1, the tools of a virtual mechanism tool box, such as the virtual mechanism tool box 106, can be used as simulations of input devices. For example, the "slider" mechanism may be used to simulate scrolling up and down. The user 308 may thus select the "slider" mechanism and move the end-effector 306 up and down to effectively use the scroll bar 402 to scroll the user-interface 400 up and down to show different portions of the user-interface 400. The user 308 may also user the "slider" mechanism to set the force $F_1$. For instance, the user may scroll the scroll bar 404A left or right to select value for the force $F_1$. Values for $F_2$ and $F_3$ may be set in a similar manner. As another example, as described above with respect to the user-interface widgets module 112 in FIG. 1, the end-effector 306 can be used as an input device simulating rotating a virtual knob 406 associated with adjusting a value for a parameter "$P_1$." The parameter $P_1$ can be associated with the trajectory or the forces to be exerted by the end-effector 306 or any other aspects affecting the task. The sliders 402, 404A, 404B, and 404C and the virtual knob 406 are example user-interface items used for illustration only, and all other types of user-interface items are contemplated.

Referring back to FIG. 2, at block 204, the method 200 includes determining task information for a task to be performed by the robotic device. The task includes a combination of subtasks of the plurality of subtasks. The task information includes a trajectory to be followed by the manipulator, where the trajectory comprises a combination of paths corresponding to the combination of subtasks. The task also includes forces to be exerted by the manipulator at points along the trajectory. The forces are based on the respective forces experienced by the manipulator while performing subtasks of the combination of subtasks For example, referring to FIGS. 3A-3B, based on the movement information received by the computing device, the computing device may be configured to combine respective paths of the subtasks to infer or determine a trajectory to be followed by the end-effector 306 to perform the task. The trajectory may be composed of a combination of the respective paths of the subtasks. The external forces experienced by the end-effector 306 by the user 308 or via interaction with the object 310 while performing each subtasks may be combined to indicate the forces that the end-effector 306 should apply to the object 310 while following the trajectory. For example, referring to FIG. 3B, the computing device may determine that the task is to trace a contour indicated by the three subtask described above at block 202 (trace the edge 312, the wall 314, and the edge 314) while exerting forces of a particular magnitude (e.g., forces sufficient to perform polishing, grinding, or deburring on the object 310).

Referring back to FIG. 2, at block 206, the method 200 includes determining, based on the task information, torques to be applied over time to the manipulator via a joint coupled to the robotic device to perform the task. The following equation describes operational space formulation of the dynamic module of a rigid robot manipulator in contact with an environment:

$$\Lambda(q)\dot{v}_e + \Gamma(q,\dot{q})v_e + \eta(q) = h_e - h_e \quad (1)$$

where q represents generalized coordinates for the robotic device that may be chosen, for example, to represent angles $\theta_1$, $\theta_2$, and $\theta_3$ of the joints of the robotic device; $\dot{q}$ is the rate of change of the generalized coordinates; $v_e$ is the velocity of the end-effector; and $\dot{v}_e$ is the acceleration of the end-effector; $\Lambda(q) = (JH(q)^{-1} J^T)^{-1}$ is a 6×6 operational space inertia matrix, where J is a body Jacobian in each manipulator frame; $\Gamma(q,\dot{q}) = J^{-T} C(q,\dot{q})J^{-1} - \Lambda(q)\dot{J}J^{-1}$ is a wrench including centrifugal and Coriolis effects; and $\eta(q) = J^{-T} g(q)$ is the wrench of gravitational effects, where H(q) (inertia), C(q,$\dot{q}$) (centrifugal and Coriolis effects), and g(q) (gravitational effects) are the corresponding quantities defined in the joint space; h is a wrench vector, where the vector $h_e = J^{-1}\tau$ is the equivalent end-effector wrench corresponding to the input joint torques τ. A wrench represents the force and torque vectors that arise in applying Newton's laws to a rigid body (e.g., the manipulator). The subscript c refers a quantity to a center of mass of the manipulator, and the subscript e refers a quantity to the end-effector.

Stiffness control of a robotic device is a type of control configured to achieve a commanded static behavior for interaction between the robotic device and the environment. Dynamics of a controlled robotic device may depend on dynamics of a manipulator of the robotic device, which is nonlinear and coupled. An objective for controlling a robotic device may include achieving a specified dynamic behavior for an end-effector coupled to the manipulator. Dynamics of the end-effector could be represented as a second-order mechanical system having six degrees of freedom characterized by a given mass, damping, and stiffness. The given mass, damping, and stiffness may be referred to collectively as mechanical impedance.

One approach to control dynamics of the end-effector may include an acceleration-resolved approach used for motion control of the end-effector. The acceleration resolved approach may be effective to decouple and linearize the nonlinear dynamics of the robotic device at a given acceleration level via an inverse dynamics control law. For example, in the presence of interaction of the robotic device with the environment, a control law may be expressed as follows:

$$h_e = \Lambda(q)\alpha + \Gamma(q,\dot{q})\dot{q} + h_e \quad (2)$$

Casting the control law of equation (2) in the dynamic model of equation (2) results in:

$$\dot{v}_e = \alpha \quad (3)$$

where α is a properly designed control input with acceleration referred to a base frame for the robotic device. Considering the identity $\dot{v}_e = \overline{R}_e^T \dot{v}_e^e + \overline{\dot{R}}_e^T v_e^e$, with $$\overline{R}_e = \begin{pmatrix} R_e & 0 \\ 0 & R_e \end{pmatrix},$$

where $R_e$ is a rotational transform matrix referred to the end-effector, $\overline{R}_e$ is the pseudo inverse of $R_e$, and superscript T indicates a transpose of a matrix.

The choice:

$$\alpha = \overline{R}_e^T \alpha^e + \overline{\dot{R}}_e^T v_e^e \quad (4)$$

results in:

$$\dot{v}_e^e = \alpha_e^e \quad (5)$$

where the control input $\alpha^e$ represents an acceleration referred to the end-effector frame $\Sigma_e$. Hence, setting:

$$\alpha^e = K_M^{-1}(\dot{v}_d^e + K_D \Delta v_{de}^e + h_\Lambda^e - h_e^e) \quad (6)$$

the following expression can be found for the closed-loop system:

$$K_M \Delta \dot{v}_{de}^e + K_D \Delta v_{de}^e + h_\Lambda^e = h_e^e \quad (7)$$

where $K_M$ and $K_D$ are 6×6 symmetric and positive definite matrices, $\Delta \dot{v}_{de}^e = \dot{v}_d^e - \dot{v}_e^e$, $\Delta v_{de}^e = v_d^e - v_e^e$, $\dot{v}_d^e$ and $v_d^e$ are, respectively, the acceleration and the velocity of a desired frame $\Sigma_d$, and $h_\Lambda^e$ is an elastic wrench. All these quantities are referred to the end-effector frame $\Sigma_e$.

Figure 5:
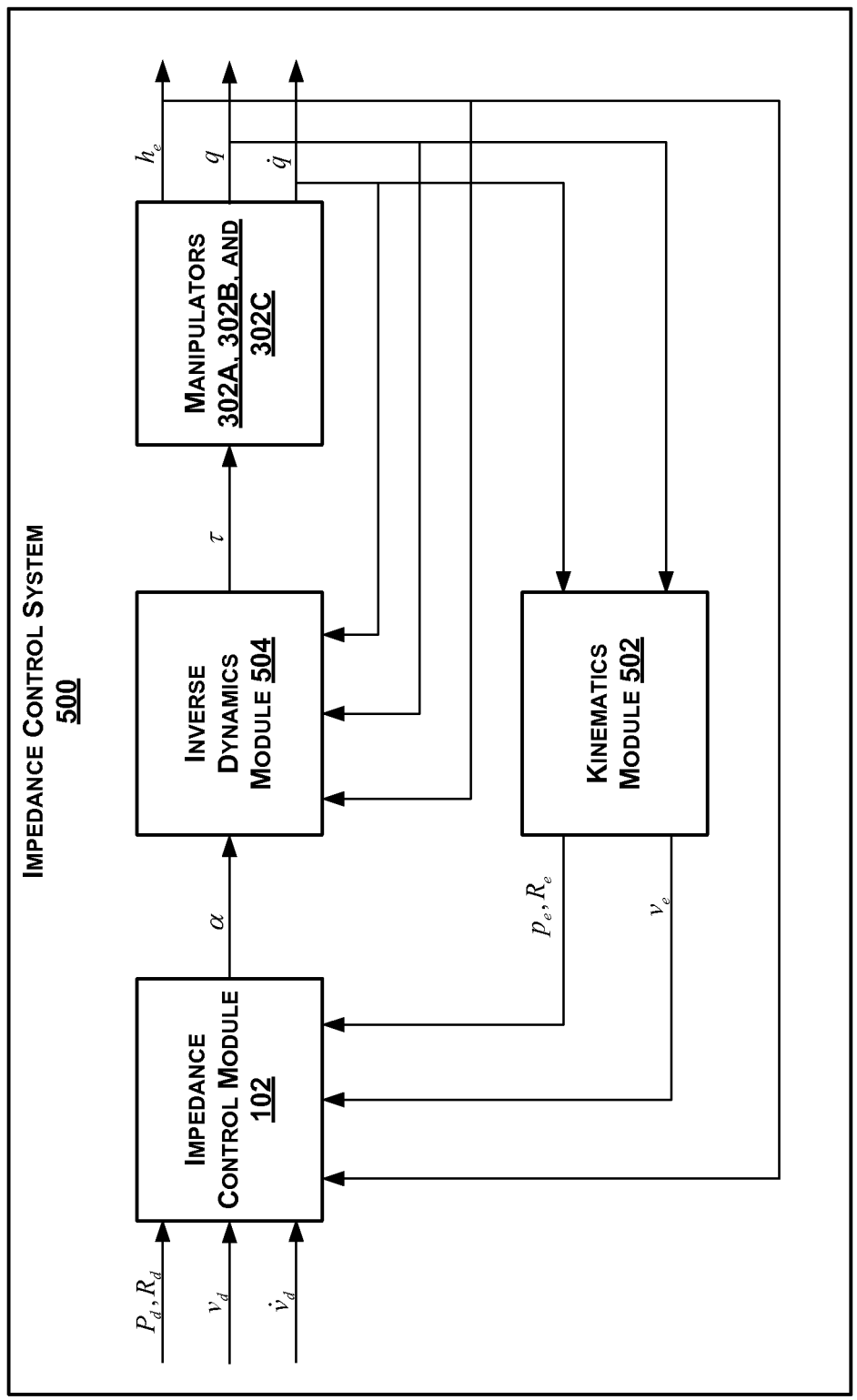
FIG. 5 illustrates a system for determining torques to be applied to manipulators of the robotic device to perform a task, in accordance with an example embodiment.

FIG. 5 illustrates an impedance control system 500 for determining the torques to be applied to manipulators of the robotic device to perform the task, in accordance with an example embodiment. The system 400 includes the manipulators 302A, 302B, and 302C interacting with an environment. The manipulators 302A, 302B, and 302C may include several sensors measuring, for example, position of the end-effector 306 coupled to the manipulator 302C, speeds of the manipulators 302A, 302B, and 302C, forces experienced by the manipulators 302A, 302B, and 302C (or torques experienced at the respective joints), etc. The sensors may be configured to measure the generalized coordinates q related to the manipulators 302A, 302B, and 302C (e.g., angles $\theta_1$, $\theta_2$, and $\theta_3$ of the manipulators 302A, 302B, and 302C as shown in FIG. 3A), and accordingly the rate of change of the generalized coordinates $\bar{q}$ can be determined. In some examples, the sensors may be configured to measure other quantities from which the generalized coordinates q and their rates of change $\dot{q}$ could be inferred or calculated. As shown in FIG. 5, a vector $h_e$ representing end-effector wrench corresponding to the input joint torques r can also be determined for the manipulators 302A, 302B, and 302C.

The quantities, q,$\dot{q}$, and $h_e$ may be input to a kinematics module 502. Kinematics refer to motion of the manipulators 302A, 302B, and 302C without regard to forces or torques that cause the motion. Kinematics of the manipulators 302A, 302B, and 302C describe position, orientation, velocity, acceleration and other higher order derivatives of the position and orientation of the manipulators 302A, 302B, and 302C and the end-effector 306. For example, based on the quantities q,q̇, and $h_e$, the kinematics module 502 may be configured to determine the position $p_e$ of the end-effector 306, a rotation matrix $R_e$ for the end-effector 306, and speed v̇ of the end-effector 306 taking into consideration geometry of the robotic device 300.

As shown in FIG. 5, the position $p_e$, rotation matrix $R_e$, speed v of the end-effector 306 along with the vector $h_e$ are input to the impedance control module 102. The impedance control module 102 may also be configured to receive a desired or commanded position $p_d$, rotation matrix $R_d$, speed $v_d$ and acceleration $\dot{v}_d$ for the end-effector 306. The commanded position $p_d$, rotation matrix $R_d$, speed $v_d$ and acceleration $\dot{v}_d$ for the end-effector 306 may be determined based on the task information (e.g., the trajectory and forces to be exerted by the end-effector 306 as determined at block 204) associated with performing a given task. Based on the inputs to the impedance control module 102, the impedance control module 102 may be configured to determine a control input α (e.g., similar to the control input $α^e$ defined in equation 6) representing an acceleration referred to a frame of the end-effector 306.

The control input α is communicated to an inverse dynamics module 504. The inverse dynamics module 504 may be configured to have access to the kinematics module 502 directly or through the impedance control module 102. The inverse dynamics module 504 also receives the parameters q,q̇, and $h_e$ as shown in FIG. 5. Based on the inputs, the kinematics of the manipulators 302A, 302B, and 302C, and the inertial properties (mass and moment of inertia) of the manipulators 302A, 302B, and 302C, the inverse dynamics module 504 may be configured to determine torques τ to be applied to the manipulators 302A, 302B, and 302C to achieve the commanded position $p_d$, rotation matrix $R_d$, speed $v_d$, and acceleration $\dot{v}_d$ for the end-effector 306. The quantities q,q̇, and $h_e$ may indicate that the commanded position $p_d$, rotation matrix $R_d$, speed $v_d$, and acceleration $\dot{v}_d$ were not achieve accurately, i.e., there is a discrepancy or an error between the commanded values and the actual values. Based on the amount of discrepancy or error, the impedance control module 102 may be configured to adjust the control input α to minimize the error.

Components of the system 500 may be configured to work in an interconnected fashion with each other and/or with other components coupled to respective systems. One or more of the described functions or components of the system 500 may be divided up into additional functional or physical components, or combined into fewer functional or physical components. In some further examples, additional functional and/or physical components may be added to the examples illustrated by FIG. 5. Still further, any of the kinematics module 502 and the inverse dynamics module 504 may include or be provided in the form of a processor (e.g., a microprocessor, a digital signal processor (DSP), etc.) configured to execute program code including one or more instructions for implementing logical functions described herein. The system 500 may further include any type of computer readable medium (non-transitory medium) or memory, for example, such as a storage device including a disk or hard drive, to store the program code. In other examples, the system 500 may be included within other systems. In an example, the kinematics module 502 and the inverse dynamics module 504 may be included within the robotic device 300 or the computing device configured to control the robotic device 300.

Thus, as shown and described with respect to FIG. 5, based on the task information (e.g., trajectory to be followed and forces to be exerted by the end-effector 306) the computing device (via the impedance control module 102 for example) determines the torques to be applied to manipulators 302A, 302B, and 302C via the respective joints to perform the task.

Figure 6:
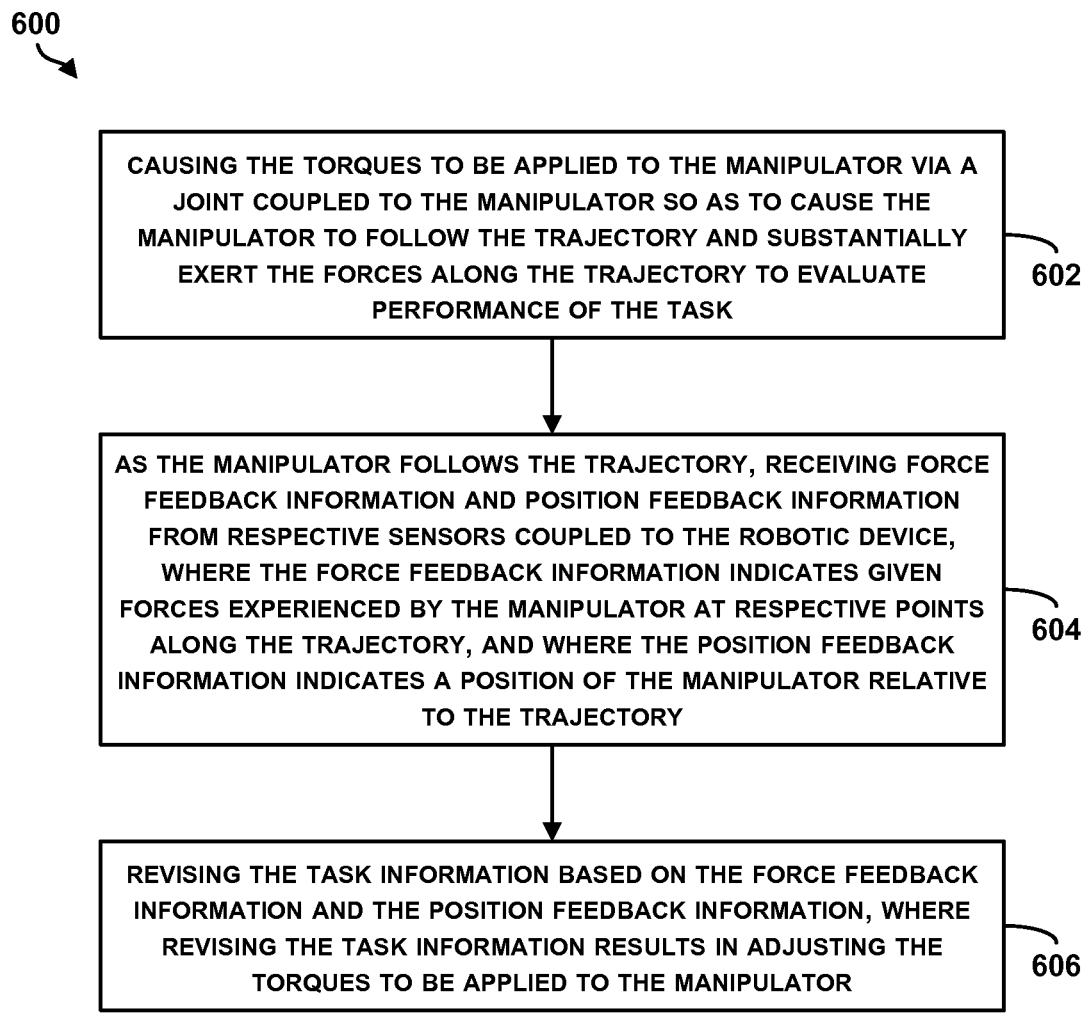
FIG. 6 is a flow chart of a method for revising task information, in accordance with an example embodiment.

FIG. 6 is a flow chart of a method 600 for revising task information, in accordance with an example embodiment, in accordance with an example embodiment. The method 600 may include one or more operations, functions, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 600 can be used with the method 200, for example.

At block 602, the method 600 includes causing the torques to be applied to the manipulator via a joint coupled to the manipulator so as to cause the manipulator to follow the trajectory and substantially exert the forces along the trajectory to evaluate performance of the task. Upon determining the task information and the torques to be applied to the manipulators 302A, 302B, and 302C to perform the task, the computing device may be configured to cause the robotic device 300 to perform the task so as to evaluate whether the task is defined correctly and whether the robotic device 300 performs the task as commanded.

The joints 304A, 304B, and 304C may include electric, hydraulic, linear, or any type of motors or actuators configured to drive the respective joints. For example, the joint 304A may be configured to apply, via any actuator coupled thereto, a torque to the manipulator 302A. In response, the manipulator 302A may follow a particular path while applying a particular force or a sequence of forces along the path. Similarly, the joints 304B and 304C may be configured to apply respective torques to the manipulators 302B and 302C so as to move the manipulators 302B and 302C according to particular respective paths and apply particular forces along the respective paths.

The computing device configured to control the robotic device 300 may provide to actuators of the joints 304A, 304B, and 304C signals corresponding to the torques τ (determined at FIG. 5), and accordingly actuate and move the manipulators 302A, 302B, and 302C. As a result of moving the manipulators 302A, 302B, and 302C, the end-effector 306 may follow the trajectory defined by the ask information and substantially exert the forces defined by the task information along the trajectory.

The word "substantially" is used herein to indicate that the forces exerted by the end-effector 306 are within a threshold value from the forces defined by the task information. For example, if the force exerted by the end-effector 306 at a given point along the trajectory is within about ±2% from the force defined by the task information, the end-effector 306 may be considered to have substantially exerted the force defined by the task information. In examples, the threshold value may be defined in units of force (e.g., ±20 Newton, lbf., etc.) instead of a percentage.

Referring back to FIG. 6, at block 604, the method 600 includes, as the manipulator follows the trajectory, receiving force feedback information and position feedback information from respective sensors coupled to the robotic device. The force feedback information indicates given forces experienced by the manipulator at respective points along the trajectory, and the position feedback information indicates a position of the manipulator relative to the trajectory.

The robotic device 300 may be configured to include a plurality of sensors coupled to the manipulators 302A, 302B, and 302C, the joints 304A, 304B, and 304C, and the end-effector 306. The plurality of sensors may include, for example, position sensors, force sensors, torque sensors, vision sensors, etc. In an example, a force sensor coupled to the end-effector 306 may be configured to measure forces experienced by end-effector 306 as the end-effector 306 follows the trajectory defined by the task information. In another example, torque sensors coupled to the joints 304A, 304B, and 304C may be configured to measure torques experienced at the joints 304A, 304B, and 304C. The forces experienced by the end-effector 306 and/or the torques experienced by the joints 304A, 304B, and 304C may be indicative of the forces exerted by the end-effector 306 (e.g., exerted on the object 310) as the end-effector 306 follows the trajectory. Other sensors coupled to the robotic device 300 may be configured to measure spatial position of the end-effector 306 and/or other parts of the robotic device 300 such as a center of gravity of the robotic device 300, or one or all of the manipulators 302A, 302B, and 302C.

Referring back to FIG. 6, at block 606, the method 600 includes revising the task information based on the force feedback information and the position feedback information, where revising the task information results in adjusting the torques to be applied to the manipulator. In an example, based on evaluation of task performance and the sensor feedback information, the computing device or the user 308 may determine that the task was not performed as intended. In response, the computing device and/or the user 308 may revise the task information and adjust parameters associated with the trajectory and the forces to be exerted so as to cause the robotic device 300 to perform the task as intended. Revising the task information and adjusting the parameters may result in adjustment of the torques to be applied to the manipulators 302A, 302B, and 302C via the joints 304A, 304B, and 304C.

As another example, based on the sensor feedback information, the computing device may be configured to determine that deviation from the trajectory and/or the forces defined by task information is larger than a threshold deviation or error allowed. For instance, the threshold deviation or error may be predefined as a percentage deviation such as a 4% deviation from the trajectory or the forces defined by the task information. Any other percentage could be used. The percentage may be based on a type of the object and/or nature of the task to be performed by the robotic device 300. In examples, instead of a percentage, the threshold error may be defined in quantities such as a deviation of 5 mm from the trajectory and a deviation of 10 N from a given force defined by the task information to be exerted at a given point along the trajectory. These values are examples for illustration and may be different based on the task. If the deviation in position or force exceeds the threshold deviation, the computing device may be configured to adjust (e.g., via the impedance control module 102 and the inverse dynamics module 504) the torques to be applied to the manipulators 302A, 302B, and 302C so as to cause the deviation to be less than the threshold deviation.

Figure 7:
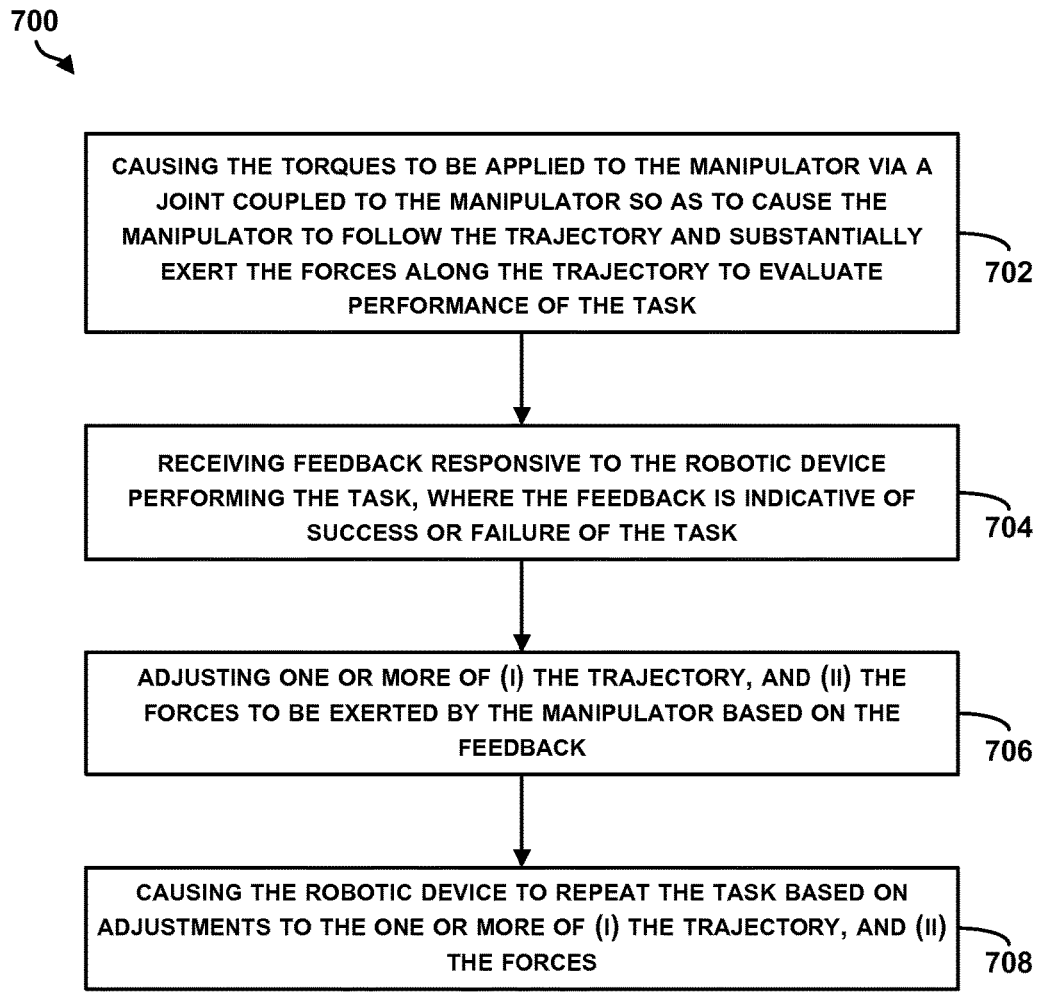
FIG. 7 is a flow chart of another method for revising task information, in accordance with an example embodiment.

FIG. 7 is a flow chart of another method 700 for revising task information, in accordance with an example embodiment. The method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 700 can be used with the methods 200 and 600, for example.

At block 702, the method 700 includes causing the torques to be applied to the manipulator via a joint coupled to the manipulator so as to cause the manipulator to follow the trajectory and substantially exert the forces along the trajectory to evaluate performance of the task. As described at block 602 of the method 600, upon determining the task information and the torques to be applied to the manipulators 302A, 302B, and 302C to perform the task, the computing device may be configured to cause the robotic device 300 to perform the task so as to evaluate whether the task is defined correctly and whether the robotic device 300 performs the task as commanded.

Referring back to FIG. 7, at block 704, the method 700 includes receiving feedback responsive to the robotic device performing the task, wherein the feedback is indicative of success or failure of the task. Success or failure may be indicated by whether the robotic device 300 performed the task as intended. For example, success or failure may be indicated by how closely the end-effector 306 follows the trajectory defined by the task information and how close the forces experienced by the end-effector 306 are to the forces defined by the task information. The feedback may be provided by the user 308 or may be determined by the computing device based on sensor feedback information.

Referring back to FIG. 7, at block 706, the method 700 includes adjusting one or more of (i) the trajectory, and (ii) the forces to be exerted by the manipulator based on the feedback. In response to the feedback received at bock 704, the computing device may revise the task information and/or adjust the torques to be applied to the manipulators 302A, 302B, and 302C.

Referring back to FIG. 7, at block 708, the method 700 includes causing the robotic device to repeat the task based on adjustments to the one or more of (i) the trajectory, and (ii) the forces. The computing device may cause the robotic device 300 to repeat the task or at least a portion of the task based on the revised task information (i.e., revised trajectory and/or revised forces to be applied by the end-effector 306) and/or based on adjustments to the torques to be applied to the manipulators 302A, 302B, and 302C to perform the task. The process of receiving feedback and repeating the portion may be continued until the portion of the task is performed satisfactorily. Performing the portion of the task satisfactorily may be indicated by the robotic device 300 performing the task as intended, the end-effector 306 being within a threshold position error from the trajectory, and the forces being experienced by the end-effector 306 being within a threshold force error from the forces defined by the task information to be exerted by the end-effector 306.

Figure 8:
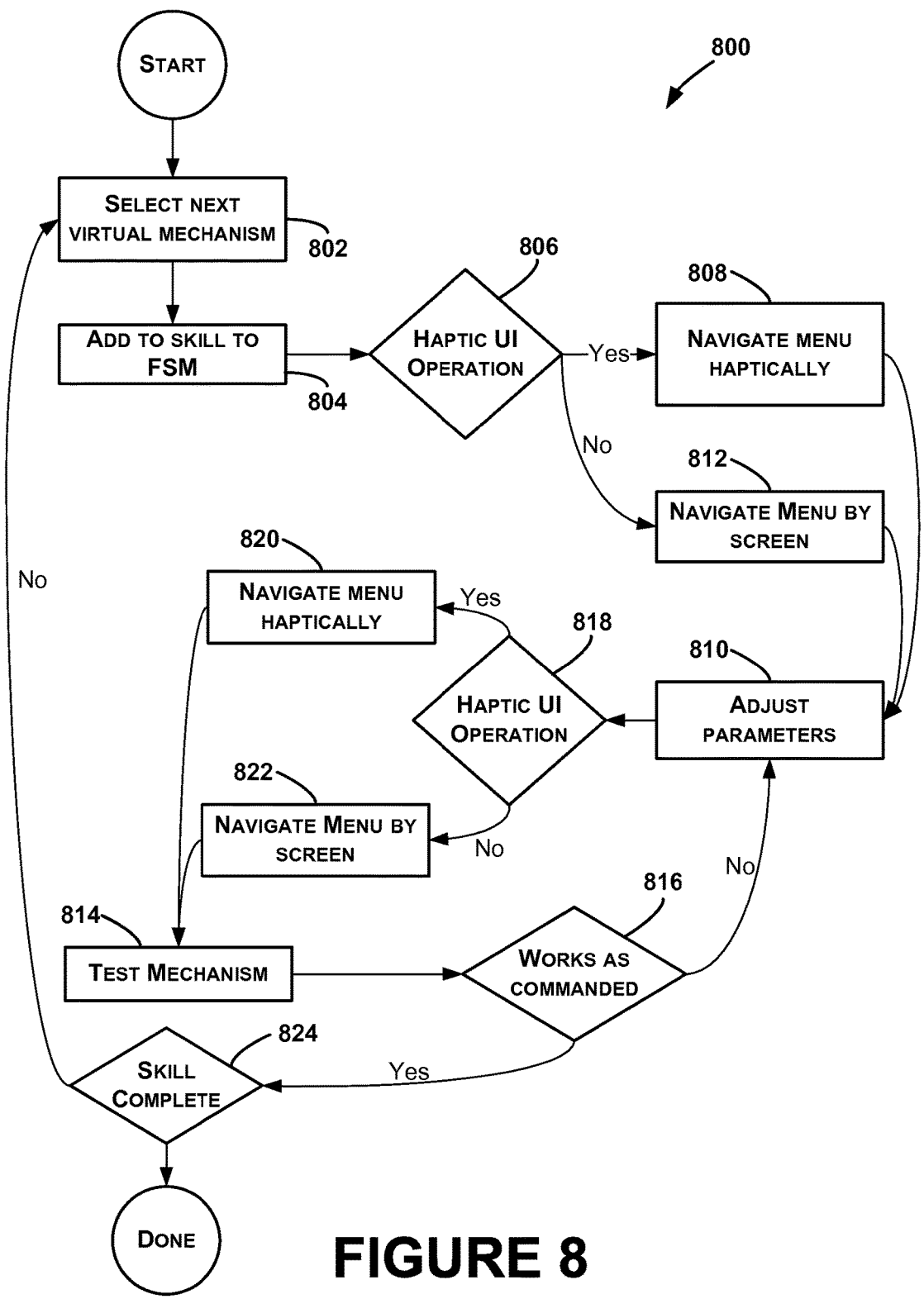
FIG. 8 is a flow chart of a method for composing a task, in accordance with an example embodiment, in accordance with an example embodiment.

FIG. 8 is a flow chart of a method 800 for composing a task, in accordance with an example embodiment. The method 800 may include one or more operations, functions, or actions as illustrated by one or more of blocks 802-824. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation. The method 800 can be implemented, for example, by the computing device configured to control the robotic device 300 as described above with respect to FIGS. 2-7.

At block 802, a virtual mechanism that can achieve a sub-segment or a subtask of a skill (a task to be performed by a robotic device) is selected from a virtual mechanism toolbox such as the virtual mechanism toolbox 106.

At block 804, the virtual mechanism is inserted into the appropriate place in the skill Finite State Machine (FSM) or automota. The FSM may represent a mathematical model of computation used to compose the task. The FSM for a task has a finite number of states, i.e., a finite number of virtual mechanisms, that when implemented in a particular order (some tasks may be performed in parallel) that the task is completed. The FSM can change or transition from one state to another (from one virtual mechanism to another) when initiated by a triggering event or condition. A particular FSM for a given task may be defined by a list of states or virtual mechanisms, and the triggering condition for each transition.

At block 806 if a haptic user-interface operation is available as described with respect to the user-interface widgets module 112 in FIG. 1 and the user-interface 400 in FIG. 4, a user can use the robotic device as an input device to navigate a user-interface (e.g., a menu) haptically at block 808 to adjust parameters of a subtask at block 810. If at block 806 a determination is made that the haptic navigation using the robotic device is not available, conventional user-interface or menu navigation on a screen may be used. For instance, the screen may be a touch screen where a user can use his fingers to navigate the user-interface, or other input devices such as a mouse, a keyboard, etc., may be coupled to a computing device in communication with the robotic device and the user-interface or screen. The input device can be used to navigate the user-interface and adjust the parameters at block 810.

At block 814 the mechanism selected at block 802 is tested (i.e., the mechanism is run for evaluation) to verify that the mechanism performs as expected. At block 816 a determination is made whether the mechanism performs as expected or as commanded. If the mechanism does not perform as commanded or as expected, parameters defining the mechanism are re-adjusted at block 810. In an example, the re-adjustment can be performed during execution of the mechanism through the blocks 818, 820, and 822. Blocks 818, 820, and 822 may function similar to respective blocks 806, 808, and 812. A determination is made at block 818 whether a haptic user-interface operation is available. If the haptic user-interface operation is available, the user-interface or menu for adjusting parameters can be navigated haptically at block 820 by using the robotic device as an input device. If the haptic user-interface operation is not available, the user-interface or menu for adjusting parameters can be navigated by interacting with the screen at block 822 through other input devices.

In an example, more than one mechanism can be tested at a given time. Thus, subsections or a collection of subtasks can be tested together. In another example, the entire skill FSM can run to verify performance of the task and adjust parameters of individual subtasks accordingly.

At block 824, a determination is made whether the skill or task in complete or more mechanisms/subtasks should be added to complete the task. If the task is not complete, more mechanisms/subtasks are added at block 802 and the process is repeated. If the task is complete, the process is done and the entire FSM (entire skill/task) can be tested for verification of performance.

Figure 9:
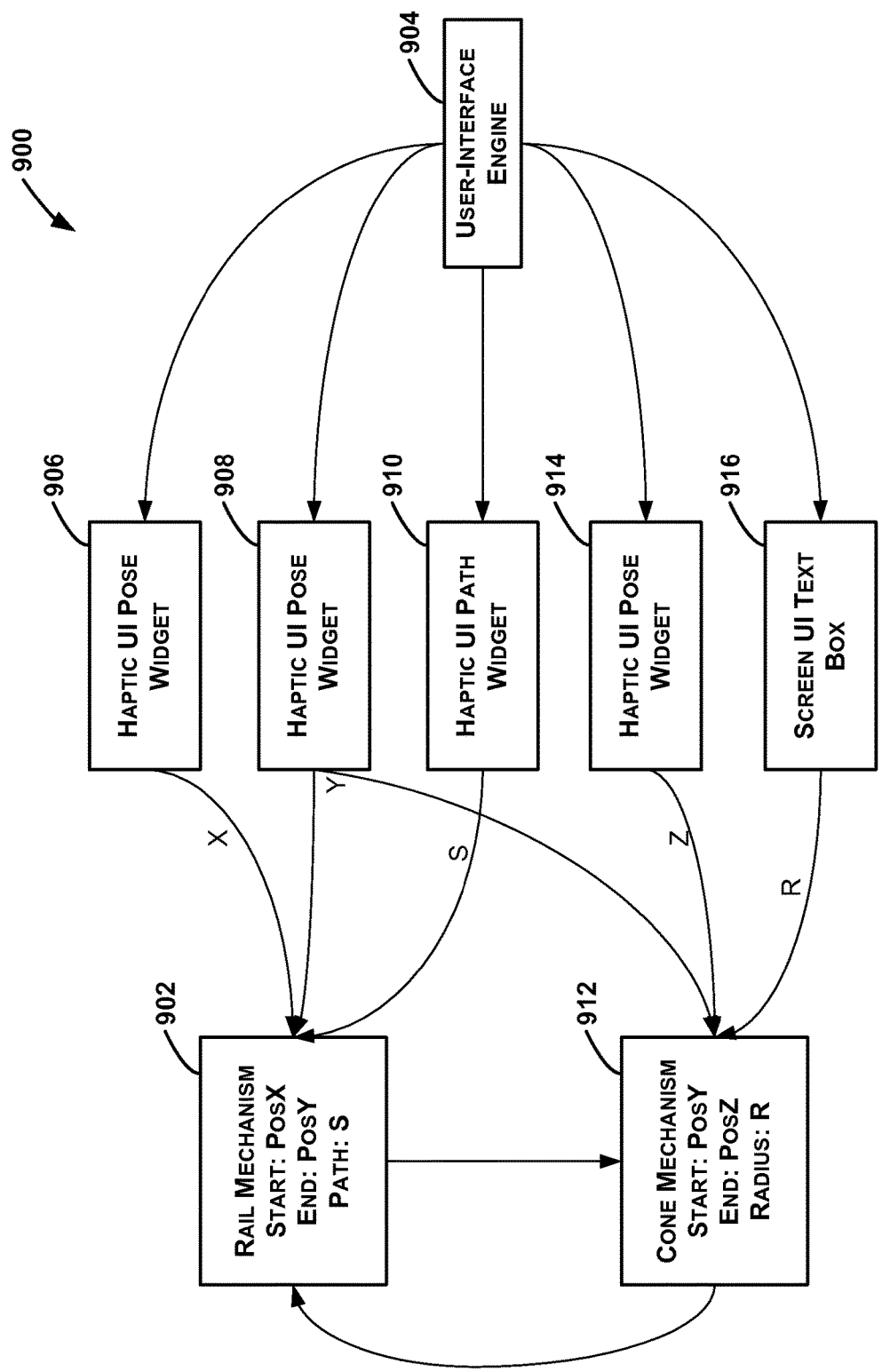
FIG. 9 is a flow chart for composing a cyclic insertion task for a robotic device, in accordance with an example embodiment, in accordance with an example embodiment.
Figure 10:
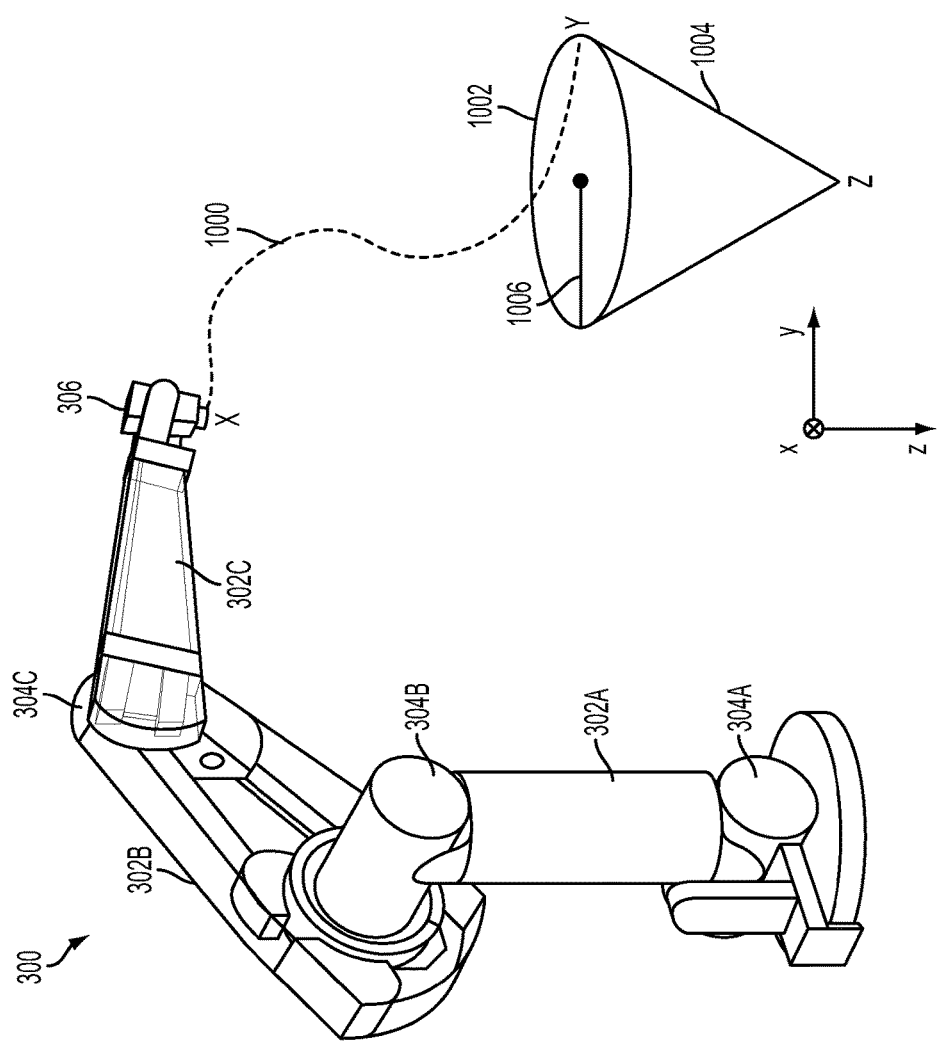
FIG. 10 illustrates the cyclic insertion task, in accordance with an example embodiment.

FIG. 9 is a block diagram illustrating composing a cyclic insertion task for a robotic device, in accordance with an example embodiment. FIG. 10 illustrates the cyclic insertion task, in accordance with an example embodiment. FIGS. 9 and 10 will be described together.

A user may select a "rail" virtual mechanism 902 from a virtual mechanism toolbox such as the virtual mechanism toolbox 106 described at FIG. 1. The "rail" mechanism 902 may involve defining a starting point X in space, an ending point Y in space, and a path S (an S-Shaped path) that connects point X to point Y.

The user can define point X, point Y, and path S through a user-interface engine 904. The user-interface engine 904 can include, for example, the user-interface widgets module 112 described at FIG. 1. The user may select, through the user-interface engine 904, a haptic user-interface pose widget 906 and physically guide an end-effector 306 of the robotic device 300 to point X shown in FIG. 10, and define or set point X as the starting point. Similarly, the user may again select a haptic user-interface pose widget 908 and physically guide the end-effector 306 of the robotic device 300 to point Y shown in FIG. 10, and define or set point Y as the end point. Further, the user may select a haptic user-interface path widget 910 and physically guide the end-effector 306 of the robotic device 300 through an S-shaped path 1000, as shown in FIG. 10, connecting point X and point Y.

Upon defining parameters of the "rail" mechanism (i.e., defining point X, point Y, and the S-shaped path 1000), the user may select or employ a "cone" mechanism 912. At point Y, the user may select, through the user-interface engine 904, a haptic user-interface pose widget 914 and physically guide the end-effector 306 to point Z at a tip of cone 1004 shown in FIG. 10 such that an impedance funnel guides the insertion along the Y-Z plane. To fully define parameters of the cone 1004, a radius 1006 of the cone 1004 can be defined, for example, through a screen user-interface text box 916.

Thus, the robotic device 300 is programmed via interaction with the robotic device 300. In this manner, programming the robotic device 300 to perform a particular task may not involve writing computer code, or at least may minimize writing computer code.

Figure 11:
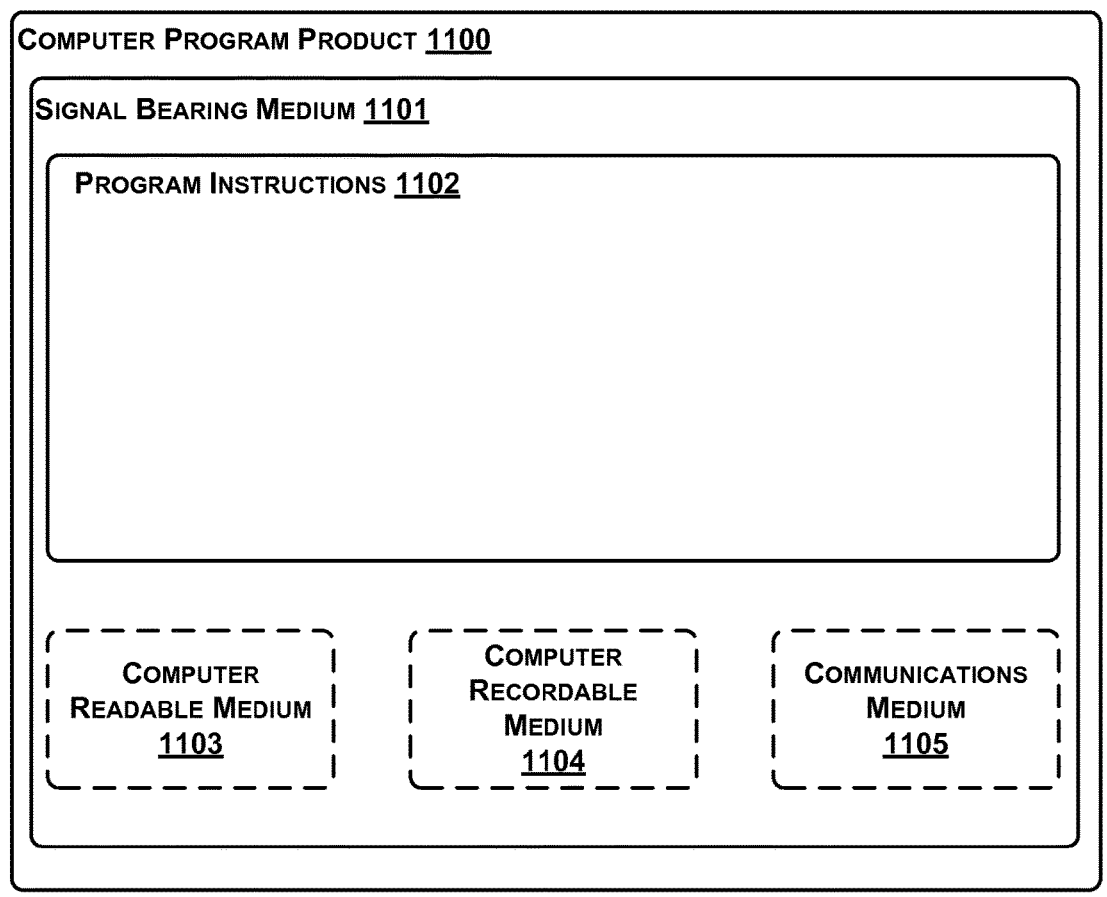
FIG. 11 is a schematic illustrating a conceptual partial view of a computer program, in accordance with an example embodiment.

In some embodiments, the disclosed methods may be implemented as computer program instructions encoded on a computer-readable storage media in a machine-readable format, or on other non-transitory media or articles of manufacture. FIG. 11 is a schematic illustrating a conceptual partial view of an example computer program product 1100 that includes a computer program for executing a computer process on a computing device, arranged according to at least some embodiments presented herein. In one embodiment, the example computer program product 1100 is provided using a signal bearing medium 1101. The signal bearing medium 1101 may include one or more program instructions 1102 that, when executed by one or more processors may provide functionality or portions of the functionality described above with respect to FIGS. 1-10. Thus, for example, referring to the embodiments shown in FIGS. 2, 6, 7, 8, and 9 one or more features of blocks 202-206, 602-606, 702-708, 802-824, and 902-916, respectively, may be undertaken by one or more instructions associated with the signal bearing medium 1101. In addition, the program instructions 1102 in FIG. 11 describe example instructions as well.

In some examples, the signal bearing medium 1101 may encompass a computer-readable medium 1103, such as, but not limited to, a hard disk drive, a Compact Disc (CD), a Digital Video Disk (DVD), a digital tape, memory, etc. In some implementations, the signal bearing medium 1101 may encompass a computer recordable medium 1104, such as, but not limited to, memory, read/write (R/W) CDs, R/W DVDs, etc. In some implementations, the signal bearing medium 1101 may encompass a communications medium 1105, such as, but not limited to, a digital and/or an analog communication medium (e.g., a fiber optic cable, a waveguide, a wired communications link, a wireless communication link, etc.). Thus, for example, the signal bearing medium 1101 may be conveyed by a wireless form of the communications medium 1105 (e.g., a wireless communications medium conforming to the IEEE 802.11 standard or other transmission protocol).

The one or more programming instructions 1102 may be, for example, computer executable and/or logic implemented instructions. In some examples, a computing device such as any of the computing devices or modules described with respect to FIGS. 1-10 may be configured to provide various operations, functions, or actions in response to the programming instructions 1102 conveyed to the computing device by one or more of the computer readable medium 1103, the computer recordable medium 1104, and/or the communications medium 1105. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

IV. CONCLUSION

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
    prior to performance of a task comprising a plurality of subtasks by a robotic device, defining the task, wherein defining the task comprises: receiving, at a computing device, movement information for the plurality of subtasks to be performed by a manipulator of the robotic device, wherein subtasks of the plurality of subtasks represent motions of the manipulator in response to external forces applied to the manipulator, wherein the movement information indicates paths to be followed by the manipulator while the robotic device is performing the subtasks and input forces to be experienced by the manipulator when following the paths, and wherein the movement information is defined by way of a virtual toolbox that simulates aspects of the manipulator;
    determining, by the computing device, task information for the plurality of subtasks, wherein the task information includes output forces to be exerted by the manipulator at points along a trajectory, wherein the output forces are based on the input forces, and a trajectory to be followed by the manipulator, wherein the trajectory comprises a combination of paths corresponding to the plurality of subtasks;
    determining, based on the task information, torques to be applied over time to the manipulator via an actuator of a joint coupled to the robotic device;
    performing the task by the robotic device, wherein performing the task comprises causing the torques to be applied to the manipulator via the actuator of the joint in accordance with the plurality of subtasks so as to cause the manipulator to follow the trajectory and exert the output forces along the trajectory, wherein performing the task comprises evaluating the task as defined; and
    automatically revising the task information based on the evaluation of the task as defined, wherein revising the task information results in adjusting the torques to be applied to the manipulator based on feedback information indicative of how closely the robot follows the trajectory and exerts the output forces along the trajectory while performing the plurality of subtasks.

2. The method of claim 1, wherein the evaluation of the task as defined comprises:
    as the manipulator follows the trajectory, receiving force feedback information and position feedback information from sensors coupled to the robotic device, wherein the force feedback information indicates given forces experienced by the manipulator at points along the trajectory, and wherein the position feedback information indicates a position of the manipulator relative to the trajectory.

3. The method of claim 1, further comprising:
    generating a display of an interface including a plurality of interface items associated with parameters describing the trajectory and the output forces to be exerted by the manipulator; and
    receiving an input via a selection of an interface item of the plurality of interface items to change a parameter of the parameters to revise one or more of the trajectory, and the output forces to be exerted by the manipulator.

4. The method of claim 3, wherein the manipulator is configured as an input device, wherein a given motion of the manipulator in response to a given external force applied to the manipulator corresponds to navigation of the interface, and wherein receiving the input comprises receiving the input in response to the given motion of the manipulator.

5. The method of claim 1, further comprising:
    generating, based on the task information, a display of the trajectory and a visual indication of direction and magnitude of the output forces to be applied along the trajectory.

6. The method of claim 1, wherein the evaluation of the task as defined comprises:
    receiving feedback responsive to the robotic device performing the task, wherein the feedback is indicative of how closely the robotic device follows the trajectory or output forces defined by the task information;

adjusting one or more of the trajectory and the output forces to be exerted by the manipulator based on the feedback; and causing the robotic device to repeat the task based on adjustments to the one or more of the trajectory and the output forces.

7. The method of claim 1, wherein the movement information comprises information indicative of constraints on motion of the manipulator in given directions.

8. A non-transitory computer readable memory having stored thereon instructions that, when executed by a computing device, cause the computing device to perform functions comprising:

prior to performance of a task comprising a plurality of subtasks by a robotic device, defining the task, wherein defining the task comprises: receiving movement information for the plurality of subtasks to be performed by a manipulator of a robotic device, wherein subtasks of the plurality of subtasks represent motions of the manipulator in response to external forces applied to the manipulator, wherein the movement information indicates paths to be followed by the manipulator while the robotic device is performing the subtasks and input forces to be experienced by the manipulator when following the paths, and wherein the movement information is defined by way of a virtual toolbox that simulates aspects of the manipulator;

determining task information for the plurality of subtasks, wherein the task information includes output forces to be exerted by the manipulator at points along a trajectory, wherein the output forces are based on the respective input forces, and a trajectory to be followed by the manipulator, wherein the trajectory comprises a combination of paths corresponding to the plurality of subtasks;

determining, based on the task information, torques to be applied over time to the manipulator via an actuator of a joint coupled to the robotic device performing the task by the robotic device, wherein performing the task comprises causing the torques to be applied to the manipulator via the actuator of the joint in accordance with the plurality of subtasks so as to cause the manipulator to follow the trajectory and exert the output forces along the trajectory, wherein performing the task comprises evaluating the task as defined; and automatically revising the task information based on the evaluation of the task as defined, wherein revising the task information results in adjusting the torques to be applied to the manipulator based on feedback information indicative of how closely the robot follows the trajectory and exerts the output forces along the trajectory while performing the plurality of subtasks k.

9. The non-transitory computer readable memory of claim 8, wherein the evaluation of the task as defined comprises:

as the manipulator follows the trajectory, receiving force feedback information and position feedback information from respective sensors coupled to the robotic device, wherein the force feedback information indicates given forces experienced by the manipulator at points along the trajectory, and wherein the position feedback information indicates a position of the manipulator relative to the trajectory.

10. The non-transitory computer readable memory of claim 8, wherein the functions further comprise:

generating a display of an interface including a plurality of interface items associated with parameters describing the trajectory and the output forces to be exerted by the manipulator; and receiving an input via a selection of an interface item of the plurality of interface items to change a parameter of the parameters to revise one or more of the trajectory, and the output forces to be exerted by the manipulator.

11. The non-transitory computer readable memory of claim 10, wherein the manipulator is configured as an input device, wherein a given motion of the manipulator in response to a given external force applied to the manipulator corresponds to navigation of the interface, and wherein receiving the input comprises receiving the input in response to the given motion of the manipulator.

12. The non-transitory computer readable memory of claim 8, wherein the functions further comprise:

generating, based on the task information, a display of the trajectory and a visual indication of direction and magnitude of the output forces to be applied along the trajectory.

13. The non-transitory computer readable memory of claim 8, wherein the evaluation of the task as defined comprises:

receiving feedback responsive to the robotic device performing the task, wherein the feedback is indicative of how closely the robotic device follows the trajectory or the output forces defined by the task information;

adjusting one or more of the trajectory and the output forces to be exerted by the manipulator based on the feedback; and causing the robotic device to repeat the task based on adjustments to the one or more of the trajectory and the output forces.

14. The non-transitory computer readable memory of claim 8, wherein the movement information comprises information indicative of constraints on motion of the manipulator in given directions.

15. A robotic device, comprising:
a manipulator;
a joint coupled to the manipulator;
an actuator coupled to the joint;
one or more processors; and
memory configured to store instructions, that when executed by the one or more processors, cause the robotic device to perform functions comprising:
prior to performance of a task comprising a plurality of subtasks by a robotic device, defining the task, wherein defining the task comprises: receiving movement information for the plurality of subtasks to be performed by the manipulator, wherein subtasks of the plurality of subtasks represent motions of the manipulator in response to external forces applied to the manipulator, and wherein the movement information indicates paths to be followed by the manipulator while the robotic device is performing the subtasks and input forces experienced by the manipulator when following the paths, and wherein the movement information is defined by way of a virtual toolbox that simulates aspects of the manipulator;

determining task information for the plurality of subtasks, wherein the task information includes output forces to be exerted by the manipulator at points along a trajectory, wherein the output forces are based on the input forces, and a trajectory to be followed by the manipulator, wherein the trajectory comprises a combination of paths corresponding to the plurality of subtasks;

determining, based on the task information, torques to be applied over time to the manipulator via the actuator of the joint;

performing the task by causing the torques to be applied to the manipulator via the actuator of the joint in accordance with the plurality of subtasks so as to cause the manipulator to follow the trajectory and exert the output forces along the trajectory, wherein performing the task comprises evaluating the task as defined; and automatically revising the task information based on the evaluation of the task as defined, wherein revising the task information results in adjusting the torques to be applied to the manipulator based on feedback information indicative of how closely the robot follows the trajectory and exerts the output forces along the trajectory while performing the plurality of subtasks.

16. The robotic device of claim 15, wherein the movement information comprises information indicative of constraints on motion of the manipulator in given directions.

17. The robotic device of claim 15, further comprising a plurality of sensors coupled to the manipulator, wherein the evaluation of the task as defined comprises:

as the manipulator follows the trajectory, receiving force feedback information and position feedback information from the plurality of sensors, wherein the force feedback information indicates given forces experienced by the manipulator at points along the trajectory, and wherein the position feedback information indicates a position of the manipulator relative to the trajectory.

18. The method of claim 1, further comprising repeating at least a portion of the task until the portion of the task is performed such that the manipulator follows the trajectory within a threshold position error from the trajectory, and the input forces experienced by the manipulator fall within a threshold force error from the output forces to be exerted by the manipulator.

19. The method of claim 1, wherein the subtasks further comprise motions of the manipulator defined by a user.

20. The method of claim 1, wherein the external forces applied to the manipulator comprise external forces experienced via interaction with an object.

\* \* \* \* \*